(No Model.)
E. R. YOUNG.
POULTRY FEEDER.
No. 582,410. Patented May 11, 1897.
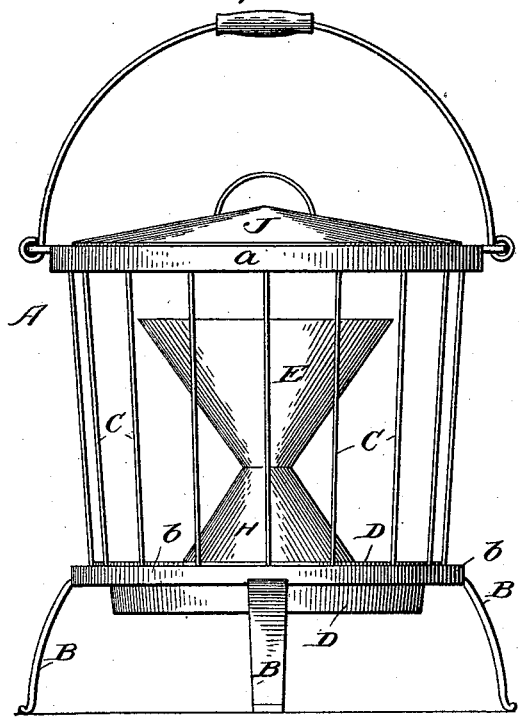
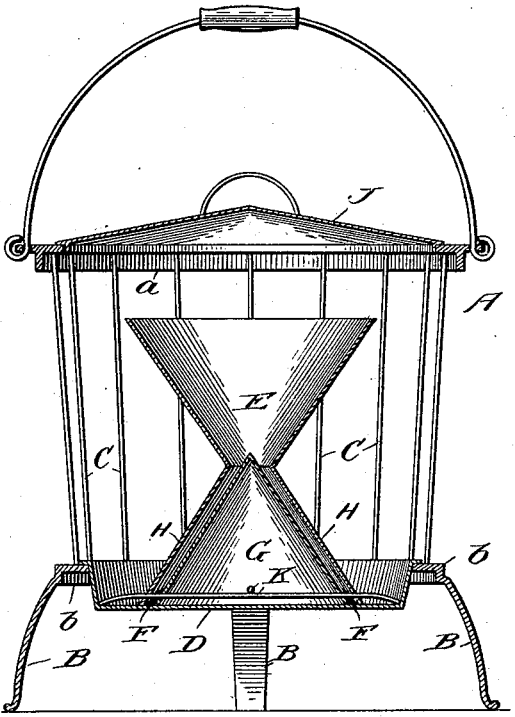
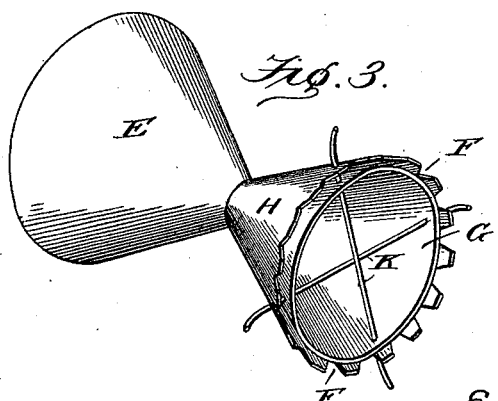
WITNESSES:
Edwin L. Bradford
K. A. Nau
INVENTOR
Edwin R. Young
BY
John Wedderburn
his ATTORNEY.

UNITED STATES PATENT OFFICE.

EDWIN R. YOUNG, OF AUBURN, MAINE.

POULTRY-FEEDER.

SPECIFICATION forming part of Letters Patent No. 582,410, dated May 11, 1897.

Application filed May 23, 1896. Serial No. 592,774. (No model.)

*To all whom it may concern:*

Be it known that I, EDWIN R. YOUNG, a citizen of the United States, residing at Auburn, in the county of Androscoggin and State of Maine, have invented certain new and useful Improvements in Poultry-Feeders; and I do hereby declare the following to be a full, clear, and exact description of the invention, such as will enable others skilled in the art to which it appertains to make and use the same.

This invention relates to certain new and useful improvements in devices for feeding fowl; and it has for its object, among others, to provide a simple and cheap device so constructed as to prevent crowding of the fowl in feeding, and saving a waste of the food as well as serving to prevent stuffing or too fast eating by the fowl. The food is fed to them slowly, yet a constant supply is provided.

Other objects and advantages of the invention will hereinafter appear, and the novel features thereof will be specifically defined by the appended claims.

The invention in this instance resides in the peculiar combinations and the construction, arrangement, and adaptation of parts, all as more fully hereinafter described, shown in the drawings, and then particularly pointed out in the claims.

The invention is clearly illustrated in the accompanying drawings, which, with the letters of reference marked thereon, form a part of this specification, and in which—

Figure 1 is a view of the improved device. Fig. 2 is a vertical section through the same. Fig. 3 is a view of the double cone removed.

Like letters of reference indicate like parts throughout the several views.

Referring now to the details of the drawings by letter, A designates the frame, which consists of the upper ring $a$ and the lower ring $b$, supported upon suitable supports or legs B, and the two rings are connected and held at the proper distance apart by the vertical rods C, of which there may be any desired number, it being designed that each fowl shall get his food through the space between two of the said rods or bars. These rings and rods may be of any suitable material and size and the rods arranged at any required distance apart.

D is a pan set within the lower ring, and within this pan is placed and supported the double-cone shaped device E, the lower edge of the lower half of which is provided with the notches F, as shown, through which the food is to be reached by the fowl. The lower portion of this cone-shaped device is made double, as shown, there being an inner cone G and an outer cone H, the space between the two being five-eighths of an inch, more or less, and the upper inverted cone I communicates with this space, so that when the food falls therefrom it slides or falls down the outer surface of the inner cone G and falls down as the fowls peck it away in the pan by reaching through between the rods.

J is a cover adapted to be placed over the top of the device.

The lower cone is provided with the crossed wires K, secured in the walls thereof and projecting through the same for a greater or less distance. These wires serve a double purpose—they hold the inner cone in place and prevent it from sliding from one side of the pan to the other.

The operation will be readily understood. The device being set up, as shown, the food is placed in the inverted cone I and as the fowl peck away at the food that falls down into the pan through the notches at the lower edge of the outer lower cone the food keeps falling, and thus there is always food in the pan so long as it lasts in the cones.

The advantages of such a construction will be readily appreciated, and its simplicity and cheapness will recommend its use.

What is claimed as new is—

1. A device for the purpose described, comprising the slatted frame, the pan supported therein, and the double cone resting in the pan and having notches at its lower edge and the independent inverted cone supported upon said pan, and extending upward within the lower portion of the double cone, as set forth.

2. The combination with the frame with its rods and pan, of the double cone with notches at its lower edge, and the inverted cone communicating with the space between the lower cones supported upon the pan with a space between the same and the parallel wall of the lower portion of the double cone, substantially as specified.

3. The device described, comprising the upper and lower rings, the vertical rods connecting the same, the pan supported by the lower ring, the double cone supported in the pan and having notches around its lower edge, and the inverted cone supported upon the outer cone and having an opening over the apex of the inner cone and the crossed wires secured within the lower cone with their ends projecting through the walls thereof, substantially as and for the purpose specified.

In testimony whereof I have signed this specification in the presence of two subscribing witnesses.

EDWIN R. YOUNG.

Witnesses:
NAHUM MORRILL.
JOHN A. MORRILL.